United States Patent [19]
Macklin et al.

[11] Patent Number: 5,737,909
[45] Date of Patent: Apr. 14, 1998

[54] METALLIC CORD FOR THE REINFORCEMENT OF ELASTOMERS

[75] Inventors: Adam Richard Macklin, Akron; Italo Marziale Sinopoli, Canton, both of Ohio

[73] Assignee: The Goodyear Tire & Rubber Company, Akron, Ohio

[21] Appl. No.: 615,338

[22] Filed: Mar. 11, 1996

[51] Int. Cl.⁶ .................................................. D07B 1/06
[52] U.S. Cl. ..................................... 57/218; 57/902
[58] Field of Search ............................. 57/902, 210, 212, 57/213, 214, 218, 236, 237

[56] References Cited

U.S. PATENT DOCUMENTS

| | | | |
|---|---|---|---|
| 4,333,306 | 6/1982 | Yamashita et al. | 57/206 |
| 4,644,989 | 2/1987 | Charvet et al. | 152/451 |
| 4,763,466 | 8/1988 | Abe et al. | 57/213 |
| 5,396,942 | 3/1995 | Ikehara et al. | 152/527 |
| 5,408,819 | 4/1995 | Nishimura et al. | 57/206 |

FOREIGN PATENT DOCUMENTS 0399795  11/1990  European Pat. Off. .

OTHER PUBLICATIONS

Research Disclosure, No. 340, 1 Aug. 1992, pp. 624–633 XP000324123 "High Tensile Strength Steel Cord Constructions for Tyres".
Patent Abstracts of Japan, vol. 096, No. 005, 31 May 1996 & JP 08 027682 A (Bridgestone Corp), 30 Jan. 1996.

*Primary Examiner*—Daniel P. Stodola
*Assistant Examiner*—Tina R. Taylor
*Attorney, Agent, or Firm*—Bruce J. Hendricks

[57] ABSTRACT

A metallic cord for the reinforcement of elastomers comprising seven strands of two filaments wherein one strand is surrounded by six strands and the six strands are twisted in the same direction and have the same lay length.

18 Claims, 4 Drawing Sheets

METALLIC CORD FOR THE REINFORCEMENT OF ELASTOMERS

BACKGROUND OF THE INVENTION

While the invention is subject to a wide range of applications, it particularly relates to metal cord, such as that used to reinforce elastomers. More particularly, the present invention is directed to a metallic cord construction used to reinforce rubber articles, including pneumatic tires.

It is known to manufacture metal cords from a plurality of filaments having the same diameter twisted together in the same direction and having the same lay length. The cord is said to have a compact cross-section which is generally the same over the length of the cord. The filaments in the cross-section are arranged in concentric layers in which the filaments are tangential to all the filaments surrounding an individual filament. The single operation produces a cord having a single, compact strand. The single strand, compact cord has the advantages of a reduced cord diameter. These advantages include: (1) a calendared ply having a reduced thickness and, therefore, requiring less calendar rubber; (2) a potential increase in the ends per inch for a given width of ply; and (3) an increased ply strength resulting from an increase in the ends per inch. The uniform cross-section is thought to more uniformly distribute the load carried by the cord to each individual filaments. The result is a higher breaking load. Further, the cord is thought to have improved fatigue resistance and greater flexibility.

In a conventional pneumatic radial tire using metal cords, as described above for reinforcement, the fatigue properties of the carcass ply and belt layer are degraded, mainly by material fatigue due to repeated strain and fretting wear in the contact portion between adjacent filaments. Both of these problems are said to be alleviated by penetration of rubber into the inside of the cord. The rubber layer interposed between the steel filaments is believed to prevent rubbing between adjacent filaments, the so-called "fretting wear."

The present invention relates to a cord having 14 filaments with improved rubber penetration into the inside of the cord. The improved rubber penetration will also provide the cord with higher corrosion resistance should the cord be exposed to moisture.

SUMMARY OF THE INVENTION

The present invention relates to metallic cord for the reinforcement of elastomers comprising seven strands of two filaments wherein one strand is surrounded by six strands and said six strands are twisted in the same direction and have the same lay length.

DETAILED DESCRIPTION OF THE PREFERRED EMBODIMENT

The present invention will be explained in more detail referring to the accompanying drawings.

Figure 1:
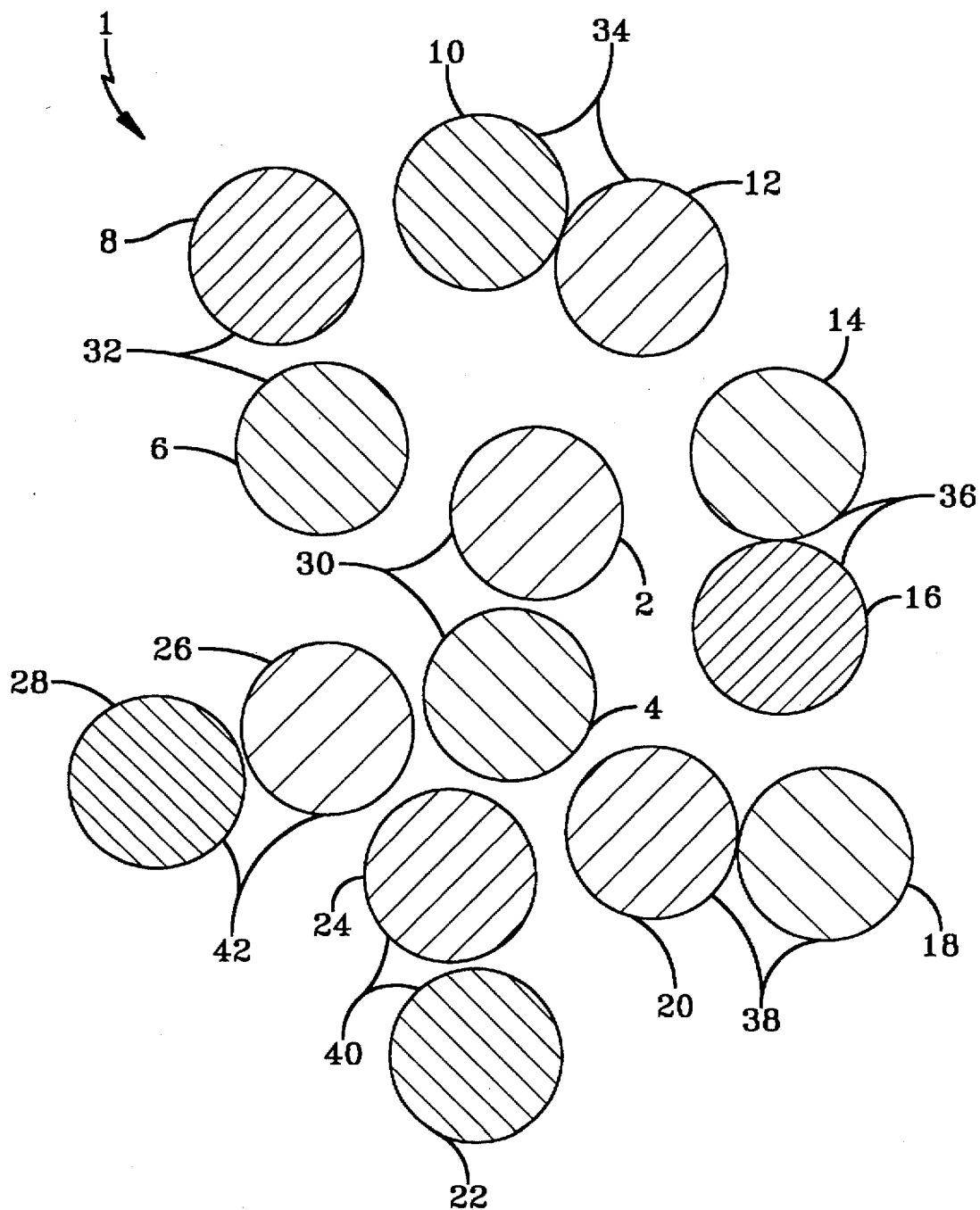
FIG. 1 is a cross-sectional view of a steel cord having a construction of the present invention.
Figure 2:
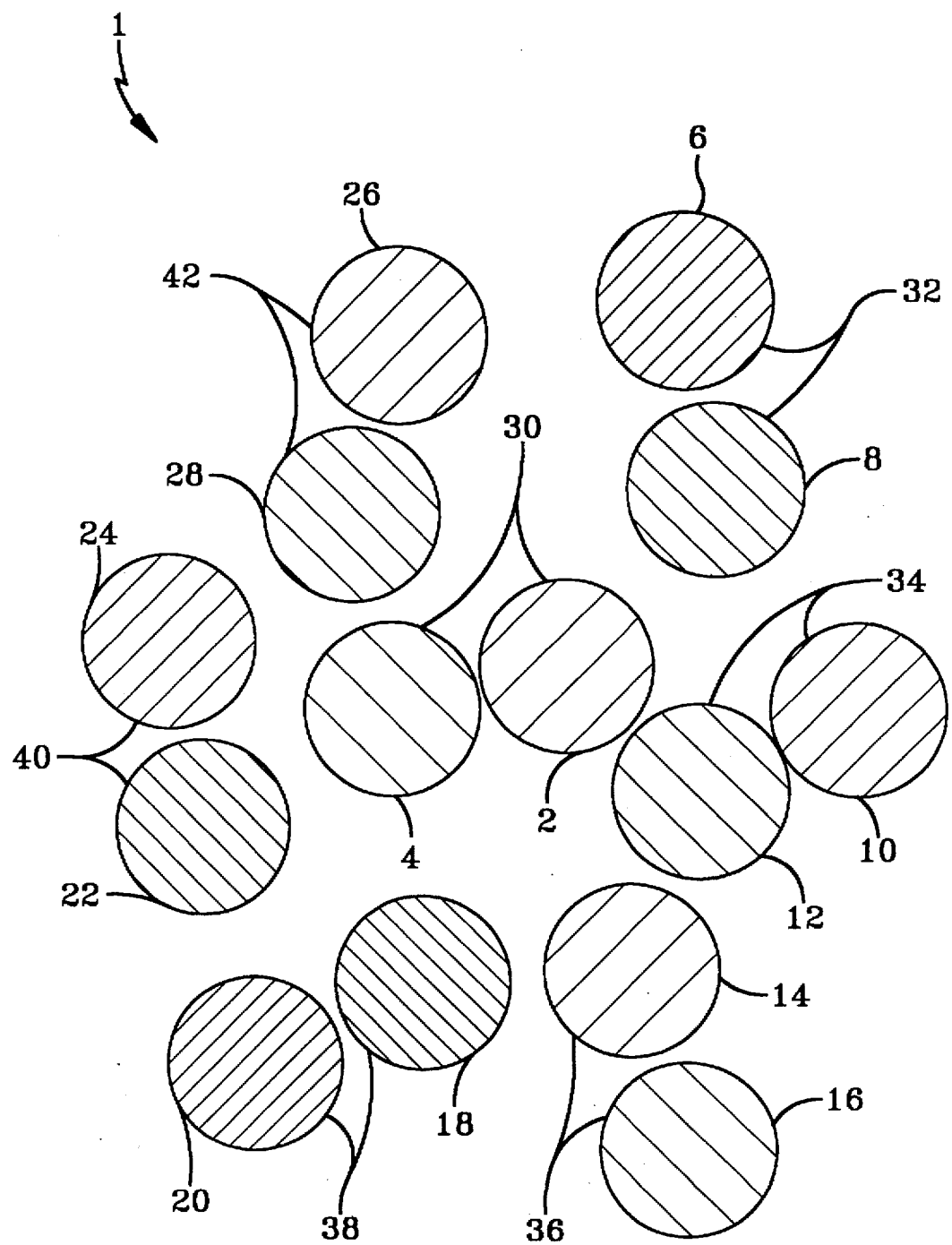
FIG. 2 is a cross-sectional view of a steel cord having a construction of the present invention.
Figure 3:
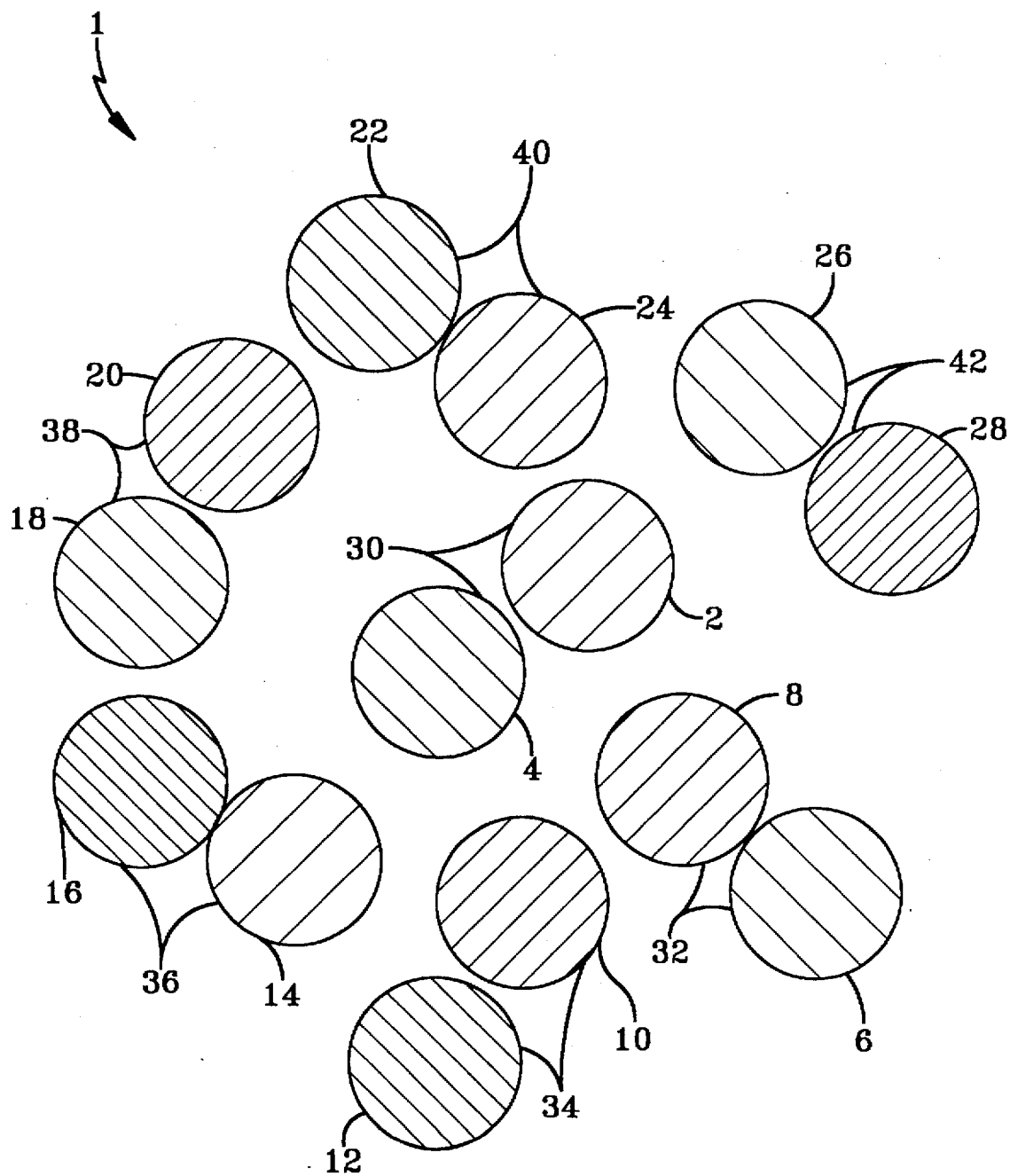
FIG. 3 is a cross-sectional view of a steel cord having a construction of the present invention.
Figure 4:
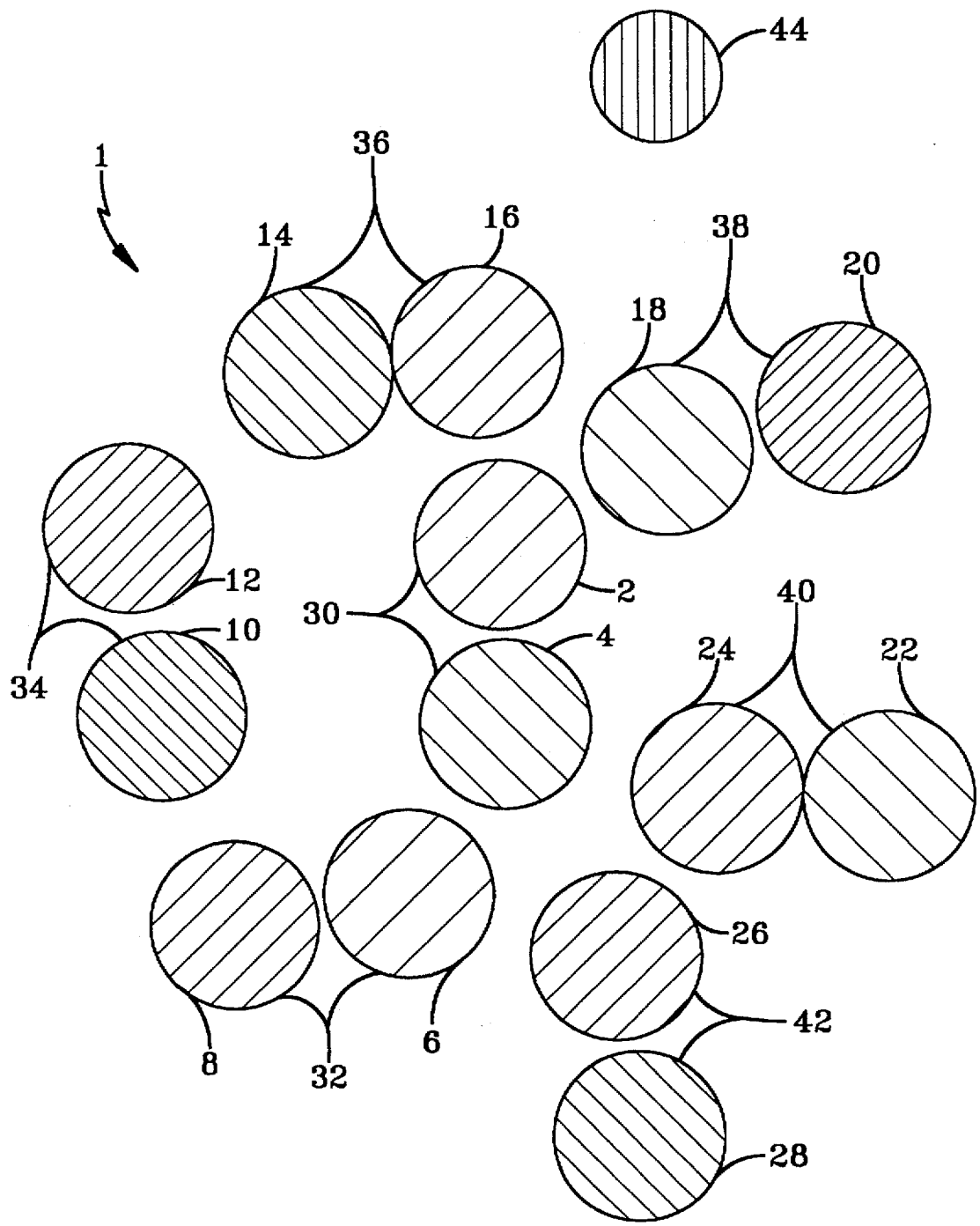
FIG. 4 is a cross-sectional view of a steel cord having a construction of the present invention.

In FIGS. 1–4, there is illustrated a metallic cord 1 for reinforcing elastomers comprising seven strands, 30,32,34, 36,38,40,42. Cords may be known by different nomenclatures. For example, the cord of the present invention may be called 1×2+6×2, 2+6×2 or 7×2.

Each strand consists of two filaments, 2 and 4, 6 and 8, 10 and 12, 14 and 16, 18 and 20, 22 and 24, and 26 and 28. One strand 30 is surrounded by the remaining six strands, 32,34, 36,38,40,42.

The term "lay length" as used in connection with a strand is the distance along the length of the strand in which the filament makes a complete 360° revolution around the outside of the strand. The lay length of the strand or each filament relative to each other in the same strand may range from about 2 to about 18 mm. Preferably, the lay length ranges from about 4 to 12 mm. The lay length of the one strand 30 my have the same length as the other six strands 32,34,36,38,40,42 or the lay lengths may be different. In all cases, the lay length of the surrounding six strands 32,34, 36,38,40,42 are the same.

All six of the surrounding strands 32,34,36,38,40,42 are twisted in the same direction, relative to each other. The center strand 30 may be twisted in the same direction as the other six strands 32,34,36,38,40,42 or may be in the opposite direction as the surrounding six strands in the cord.

The diameter of a filament 2 may vary, depending on the intended use of the cord 1. The diameter of the filament 2 may range from about 0.10 to about 0.50 mm. Preferably, the diameter of the filament 2 ranges from about 0.15 to about 0.35 mm.

The tensile strength of each filament should be at least 3040 MPa–(1200×D) where D is the diameter of the filament expressed in millimeters. Preferably, the tensile strength of each filament ranges from about 3040 MPa– (1200×D) to 4400 MPa–(2000×D).

After each of the seven strands 30,32,34,36,40,42 have been prepared, the strands 30,32,34,36,40,42 are twisted to form the cord 1 of the present invention. The one strand 30 is in the center with the remaining six strands 32,34,36,38, 40,42 being twisted around the center strand 30.

As used in connection with the cord, the term lay length means the distance along the length of the cord for one of the surrounding six strands 32,34,36,38,40,42 to make a complete 360° revolution around the outside of the cord 1. The lay length of the cord 1 ranges from about 3 to about 25 mm. Preferably, the lay length of the cord 1 ranges from about 5 to about 20 mm.

The helix angle of the cord will generally range from about 80° to 86°. Preferably, the helix angle ranges from about 82° to 84°.

The cord 1 of the present invention may optionally have a spiral wrap 44. The spiral wrap 44 may have a diameter from about 0.1 to 0.3 mm. Preferably, the diameter is 0.15 mm. The lay direction of the spiral wrap is generally in the opposite direction and the cord lay direction with the lay length ranging from 3 to 7 mm. Preferably, the lay length of the spiral wrap is 5 mm.

The intended use of the cord of the present invention is in a rubber-reinforced article. Such articles will incorporate the cord of the present invention and impregnated with rubber as known to those skilled in the art. Representative of articles may use the cord of the present invention include belts, tires and hoses. In the most preferred application, the cord of the present invention is used in a belt ply of a pneumatic tire or the carcass ply of a pneumatic tire.

What is claimed is:

1. A metallic cord for the reinforcement of elastomers, said metallic cord consisting of a selected one of
   (a) seven strands of two filaments wherein one strand is surrounded by six strands and said six strands are twisted in the same direction and have the same lay length in the cord; and
   (b) seven strands of two filaments wherein one strand is surrounded by six strands and said six strands are twisted in the same direction and have the same lay length in the cord and a spiral filament wrapped around said seven strands of two filaments.

2. The cord of claim 1 wherein the lay length of the one strand has a different lay length than the surrounding six strands.

3. The cord of claim 1 wherein the lay length of the one strand has the same lay length as the surrounding six strands.

4. The cord of claim 1 wherein the lay length of each of the six strands range from 2 to 18 mm.

5. The cord of claim 1 wherein the lay length of the one strand ranges from 2 to 18 mm.

6. The cord of claim 1 wherein said one strand is twisted in the same direction as the surrounding six strands.

7. The cord of claim 1 wherein said one strand is twisted in an opposite direction as the surrounding six strands in the cord.

8. The cord of claim 1 wherein the diameter of each filament ranges from 0.1 to 0.5 mm.

9. The cord of claim 1 wherein said cord is impregnated with rubber.

10. The cord of claim 1 wherein the diameter of the spiral filament wrapped around said seven strands of two filaments is from 0.1 to 0.3 mm.

11. The cord of claim 10 wherein the lay direction of the spiral filament is in the opposite direction to the cord lay direction.

12. The cord of claim 1 wherein said selected one is seven strands of two filaments wherein one strand is surrounded by six strands and said six strands are twisted in the same direction and have the same lay length in the cord.

13. The cord of claim 1 wherein said selected one is seven strands of two filaments wherein one strand is surrounded by six strands and said six strands are twisted in the same direction and have the same lay length in the cord and a spiral filament wrapped around said seven strands.

14. A pneumatic tire characterized by at least one metallic cord, each metallic cord consisting of a selected one of
   (a) seven strands of two filaments wherein one strand is surrounded by six strands and said six strands are twisted in the same direction and have the same lay length in the cord; and
   (b) seven strands of two filaments wherein one strand is surrounded by six strands and said six strands are twisted in the same direction and have the same lay length in the cord and a spiral filament wrapped around said seven strands of two filaments.

15. The pneumatic tire of claim 14 wherein said cord is used in a belt ply.

16. The pneumatic tire of claim 14 wherein said cord is used in the carcass ply.

17. The pneumatic tire of claim 14 wherein the tensile strength of each filament is at least $$3040 \text{ Mpa} - (1200 \times D)$$

where D is the diameter of the filament in millimeters.

18. The pneumatic tire of claim 17 wherein the tensile strength of each filament ranges from $$3040 \text{ Mpa} - (1200 \times D)$$

to $$4400 \text{ Mpa} - (2000 \times D).$$

* * * * *